US011755138B2

(12) United States Patent
Dai

(10) Patent No.: US 11,755,138 B2
(45) Date of Patent: Sep. 12, 2023

(54) TOUCH CONTROL SUBSTRATE, TEST METHOD THEREOF, AND MANUFACTURING METHOD OF TOUCH CONTROL SCREEN

(71) Applicant: TCL CHINA STAR OPTOELECTRONICS TECHNOLOGY CO., LTD., Shenzhen (CN)

(72) Inventor: Aimin Dai, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 48 days.

(21) Appl. No.: 17/425,697

(22) PCT Filed: May 19, 2021

(86) PCT No.: PCT/CN2021/094546
§ 371 (c)(1),
(2) Date: Jul. 23, 2021

(87) PCT Pub. No.: WO2022/183599
PCT Pub. Date: Sep. 9, 2022

(65) Prior Publication Data
US 2022/0283687 A1    Sep. 8, 2022

(30) Foreign Application Priority Data

Mar. 4, 2021  (CN) .......................... 202110239100.X

(51) Int. Cl.
*G06F 3/041*      (2006.01)
*G06F 11/22*     (2006.01)

(52) U.S. Cl.
CPC ........ *G06F 3/04164* (2019.05); *G06F 3/0418* (2013.01); *G06F 2203/04103* (2013.01)

(58) Field of Classification Search
None
See application file for complete search history.

(56) References Cited

U.S. PATENT DOCUMENTS

| 2019/0018517 | A1  | 1/2019 | Chang |  |
|---|---|---|---|---|
| 2019/0129543 | A1* | 5/2019 | Watanabe | ............... H05K 1/184 |
| 2020/0090567 | A1* | 3/2020 | Lee | ....................... G09G 3/3266 |

FOREIGN PATENT DOCUMENTS

| CN | 104536630 A |   | 4/2015 |             |
|----|-------------|---|--------|-------------|
| CN | 104808859 A | * | 7/2015 | ............. G06F 3/041 |

(Continued)

OTHER PUBLICATIONS

International Search Report in International application No. PCT/CN2021/094546 dated Nov. 17, 2021.

(Continued)

*Primary Examiner* — Krishna P Neupane
(74) *Attorney, Agent, or Firm* — PV IP PC; Wei Te Chung; Zhigang Ma

(57) ABSTRACT

The present application provides a touch control substrate, a test method thereof, and a manufacturing method of a touch control screen. The touch control substrate includes touch control electrodes, test terminals, and electrical connection members. Each of the test terminals is connected to two adjacent touch control electrodes. Each of the electrical connection members corresponds to each of the touch control electrodes. The touch control electrodes are electrically connected to the test terminals through the electrical connection members. The touch control electrodes form a series circuit through the corresponding electrical connection members and the corresponding test terminals.

14 Claims, 7 Drawing Sheets

(56) References Cited

FOREIGN PATENT DOCUMENTS

| CN | 106201137 | A | | 12/2016 | | |
|----|-----------|---|---|---------|---|---|
| CN | 109271052 | A | | 1/2019 | | |
| CN | 111129090 | A | | 5/2020 | | |
| CN | 211087195 | U | | 7/2020 | | |
| JP | 2016194748 | A | * | 11/2016 | ............. | G06F 3/041 |
| WO | 2012030704 | A2 | | 3/2012 | | |

OTHER PUBLICATIONS

Chinese Office Action issued in corresponding Chinese Patent Application No. 202110239100.X dated Nov. 24, 2022, pp. 1-8.

* cited by examiner

US 11,755,138 B2

TOUCH CONTROL SUBSTRATE, TEST METHOD THEREOF, AND MANUFACTURING METHOD OF TOUCH CONTROL SCREEN

RELATED APPLICATIONS

This application is a Notional Phase of PCT Patent Application No. PCT/CN2021/094546 having international filing date of May 19, 2021, which claims the benefit of priority of Chinese Patent Application No. 202110239100.X filed on Mar. 4, 2021. The contents of the above applications are all incorporated by reference as if fully set forth herein in their entirety.

FIELD OF INVENTION

The present application is related to the field of display technology and specifically to a touch control substrate, a test method thereof, and a manufacturing method of a touch control screen.

BACKGROUND OF INVENTION

With development of display technology, demands for touch controls on large-size display panels are increasing. In addition, advantages of touch control screens, such as high sensitivity, low delay, and narrow bezels, have gradually become a trend of large-size touch control screens.

For the large-size touch control screens, before flexible circuit boards are bonded, open circuit and short circuit tests need to be performed on all channels to ensure normal operations of touch control functions. A traditional channel test is to test bonding terminals at both ends of touch control electrodes. However, due to a large number of channels in a current large-size touch control screen, an area of each terminal is small. With respect to an accuracy of a probe test equipment, it is difficult to ensure that each terminal is accurately connected, which causes low reliability and inability to perform an accurate touch control test.

Currently, there is an urgent need for a touch control substrate and test method thereof to solve the above technical problems.

SUMMARY OF INVENTION

The present application provides a touch control substrate, a test method thereof, and a manufacturing method of a touch control screen to relieve a technical problem that an accurate touch control test cannot be performed due to a small area of each terminal.

The present application provides a touch control substrate. The touch control substrate includes a touch control region, test regions positioned on both sides of the touch control region, and cutting regions positioned between the test regions and the touch control region.

The touch control substrate further includes:
a plurality of touch control electrodes positioned in the touch control region, extending in a first direction, and arranged at intervals along a second direction, wherein the first direction is perpendicular to the second direction;
a plurality of electrical connection members positioned in the cutting regions and electrically connected to the touch control electrodes; and
a plurality of test terminals positioned in the test regions, wherein each of the test terminals is connected to two adjacent touch control electrodes through the electrical connection members.

In the touch control substrate of the present application, each of the electrical connection members includes a first connection segment and a second connection segment, which are continuous. The first connection segment is connected to one of the touch control electrodes. The second connection segment is connected to one of the test terminals.

In two electrical connection members connected to a same one of the test terminals, a distance between two adjacent second connection segments is greater than a distance between two adjacent touch control electrodes.

In the touch control substrate of the present application, in a direction of the first connection segment toward the second connection segment, a width of the first connection segment gradually decreases, a maximum width of the first connection segment is equal to a width of each of the touch control electrodes, and a minimum width of the first connection segment is equal to a width of the second connection segment.

In the touch control substrate of the present application, each of the electrical connection members includes a first connection segment and a second connection segment, which are discontinuous, and further includes an electrical switch positioned on the second connection segment. The first connection segment is connected to one of the touch control electrodes. The second connection segment is connected to one of the test terminals. The electrical switch is configured to control an electrical connection and an insulation connection between the first connection segment and the second connection segment.

In the touch control substrate of the present application, the touch control substrate further includes a first test subregion positioned on a first side of the touch control region and a second test subregion positioned on a second side of the touch control region.

The test regions are provided with n test terminals. A $(2k-1)$-th test terminal is positioned in the first test subregion. A $2k$-th test terminal is positioned in the second test subregion.

The touch control region is provided with $n+1$ touch control electrodes arranged at intervals along the second direction. A $(2k-1)$-th touch control electrode is connected to a $2k$-th touch control electrode through the $(2k-1)$-th test terminal. The $2k$-th touch control electrode is connected to a $(2k+1)$-th touch control electrode through the $2k$-th test terminal.

n and k are positive integers. n is greater than or equal to $2k$.

In the touch control substrate of the present application, the test regions are provided with a first connection test terminal connected to a first touch control electrode and a second connection test terminal connected to an $(n+1)$-th touch control electrode. The first connection test terminal and the second connection test terminal form a series loop through an external device.

The present application further discloses a test method of a touch control substrate, which includes:
providing the above touch control substrate, wherein the touch control substrate includes a touch control region, test regions positioned on both sides of the touch control region, and cutting regions positioned between the test regions and the touch control region; wherein the touch control substrate further includes a plurality of touch control electrodes positioned in the touch control region, extending in a first direction, and arranged at intervals along a second direction, a plurality of electrical connection members positioned in the cutting regions and electrically connected to the touch control electrodes, and a plurality of test terminals positioned in the test regions; wherein the first direction is perpendicular to the second direction, and each of the test terminals is connected to two adjacent touch control electrodes through the electrical connection members;

forming a series loop of the touch control electrodes, the electrical connection members, and the test terminals on the touch control substrate through an external power;

obtaining a measured voltage between an a-th test terminal and a b-th test terminal through a detection member;

determining the touch control electrodes between the a-th test terminal and the b-th test terminal being an open circuit when the measurement voltage is zero volt (V); and determining the touch control electrodes between the a-th test terminal and the b-th test terminal being a short circuit when the measurement voltage is greater than a first threshold voltage or less than a second threshold voltage.

a and b are positive integers. a is less than or equal to b. b is less than or equal to n+1.

In the test method of the touch control substrate of the present application, each of the electrical connection members includes a first connection segment and a second connection segment, which are continuous. The first connection segment is connected to one of the touch control electrodes. The second connection segment is connected to one of the test terminals.

In two electrical connection members connected to a same one of the test terminals, a distance between two adjacent second connection segments is greater than a distance between two adjacent touch control electrodes.

In the test method of the touch control substrate of the present application, in a direction of the first connection segment toward the second connection segment, a width of the first connection segment gradually decreases, a maximum width of the first connection segment is equal to a width of each of the touch control electrodes, and a minimum width of the first connection segment is equal to a width of the second connection segment.

In the test method of the touch control substrate of the present application, each of the electrical connection members includes a first connection segment and a second connection segment, which are discontinuous, and further includes an electrical switch positioned on the second connection segment. The first connection segment is connected to one of the touch control electrodes. The second connection segment is connected to one of the test terminals. The electrical switch is configured to control an electrical connection and an insulation connection between the first connection segment and the second connection segment.

In the test method of the touch control substrate of the present application, the touch control substrate further includes a first test subregion positioned on a first side of the touch control region and a second test subregion positioned on a second side of the touch control region.

The test regions are provided with n test terminals. A (2k−1)-th test terminal is positioned in the first test subregion. A 2k-th test terminal is positioned in the second test subregion.

The touch control region is provided with n+1 touch control electrodes arranged at intervals along the second direction. A (2k−1)-th touch control electrode is connected to a 2k-th touch control electrode through the (2k−1)-th test terminal. The 2k-th touch control electrode is connected to a (2k+1)-th touch control electrode through the 2k-th test terminal.

n and k are positive integers. n is greater than or equal to 2k.

The present application further provides a manufacturing method of a touch control screen. The touch control screen includes a display panel and a touch control member positioned on the display panel. The manufacturing method of the touch control screen includes:

providing a touch control substrate;

cutting the touch control substrate along cutting lines in cutting regions of the touch control substrate by a predetermined process to form the touch control member; and aligning and attaching the touch control member to the display panel.

In the manufacturing method of the touch control screen of the present application, the step of cutting the touch control substrate along the cutting lines in the cutting regions of the touch control substrate by the predetermined process to form the touch control member includes:

obtaining information of positions of the cutting lines of the touch control substrate; and cutting electrical connection members in the cutting regions according to the positions of the cutting lines by a laser cutting process to insulatedly connect test terminals and touch control electrodes; or cutting a substrate and the electrical connection members on the substrate in the cutting regions according to the positions of the cutting lines by the laser cutting process to insulatedly connect the test terminals and the touch control electrodes.

In the manufacturing method of the touch control screen of the present application, each of the electrical connection members includes a first connection segment and a second connection segment. The first connection segment is connected to one of the touch control electrodes. The second connection segment is connected to one of the test terminals. An orthographic projection of the cutting lines on the touch control members is parallel to the second direction and intersects the second connection segment.

In the manufacturing method of the touch control screen of the present application, the touch control substrate includes a touch control region, test regions positioned on both sides of the touch control region, and the cutting regions positioned between the test regions and the touch control region.

The touch control substrate further includes:

a plurality of touch control electrodes positioned in the touch control region, extending in a first direction, and arranged at intervals along a second direction, wherein the first direction is perpendicular to the second direction;

a plurality of electrical connection members positioned in the cutting regions and electrically connected to the touch control electrodes; and a plurality of test terminals positioned in the test regions, wherein each of the test terminals is connected to two adjacent touch control electrodes through the electrical connection members.

In the manufacturing method of the touch control screen of the present application, each of the electrical connection members includes a first connection segment and a second connection segment, which are continuous. The first connection segment is connected to one of the touch control electrodes. The second connection segment is connected to one of the test terminals.

In two electrical connection members connected to a same one of the test terminals, a distance between two adjacent second connection segments is greater than a distance between two adjacent touch control electrodes.

In the manufacturing method of the touch control screen of the present application, in a direction of the first connection segment toward the second connection segment, a width of the first connection segment gradually decreases, a maximum width of the first connection segment is equal to a width of each of the touch control electrodes, and a minimum width of the first connection segment is equal to a width of the second connection segment.

In the manufacturing method of the touch control screen of the present application, each of the electrical connection members includes a first connection segment and a second connection segment, which are discontinuous, and further includes an electrical switch positioned on the second connection segment. The first connection segment is connected to one of the touch control electrodes. The second connection segment is connected to one of the test terminals. The electrical switch is configured to control an electrical connection and an insulation connection between the first connection segment and the second connection segment.

In the manufacturing method of the touch control screen of the present application, the touch control substrate further includes a first test subregion positioned on a first side of the touch control region and a second test subregion positioned on a second side of the touch control region.

The test regions are provided with n test terminals. A (2k−1)-th test terminal is positioned in the first test subregion. A 2k-th test terminal is positioned in the second test subregion.

The touch control region is provided with n+1 touch control electrodes arranged at intervals along the second direction. A (2k−1)-th touch control electrode is connected to a 2k-th touch control electrode through the (2k−1)-th test terminal. The 2k-th touch control electrode is connected to a (2k+1)-th touch control electrode through the 2k-th test terminal.

n and k are positive integers. n is greater than or equal to 2k.

In the manufacturing method of the touch control screen of the present application, the test regions are provided with a first connection test terminal connected to a first touch control electrode and a second connection test terminal connected to an (n+1)-th touch control electrode. The first connection test terminal and the second connection test terminal form a series loop through an external device.

The present application provides the touch control substrate, the test method thereof, and the manufacturing method of the touch control screen. The touch control substrate includes the touch control region, the test regions, and the cutting regions. The touch control substrate further includes: the plurality of touch control electrodes positioned in the touch control region; the plurality of test terminals positioned in the test regions, wherein each of the test terminals is connected to two adjacent touch control electrodes; and the plurality of electrical connection members positioned in the cutting regions, wherein each of the electrical connection members corresponds to each of the touch control electrodes. The touch control electrodes are electrically connected to the test terminals through the electrical connection members. The touch control electrodes form a series circuit through the corresponding electrical connection members and the corresponding test terminals. During a test, the external power makes the series circuit into a series loop. An abnormality of the touch control electrodes is determined by the measurement voltage between any two test terminals in the series loop obtained by the detection member. This relieves a technical problem that an accurate touch control test cannot be performed due to a small area of each terminal in the current large-size touch control screens.

DETAILED DESCRIPTION OF EMBODIMENTS

Figure 1:
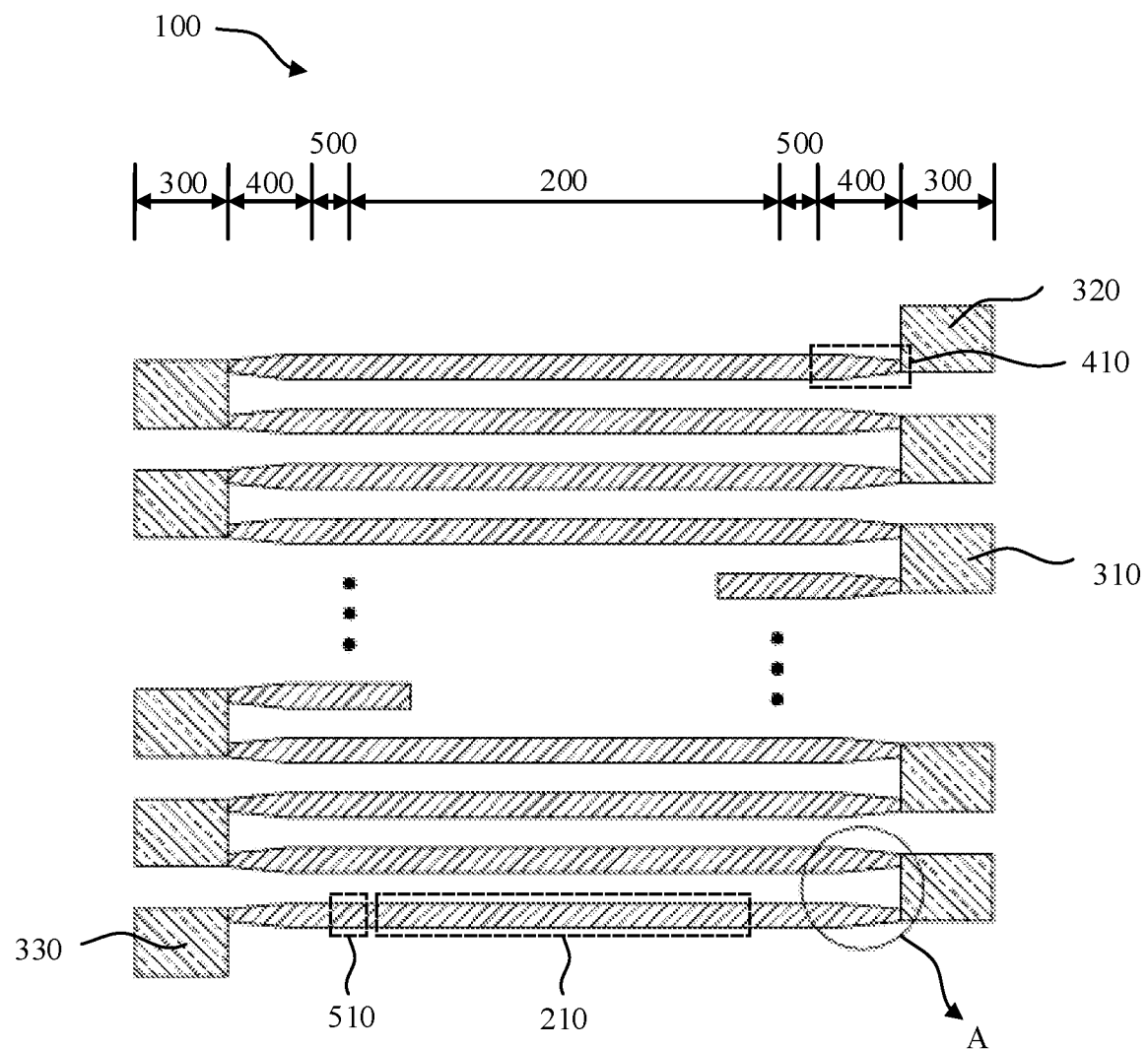
FIG. 1 is a structural diagram of a top view of a touch control substrate of the present application.

In order to make purposes, technical solutions, and effects of the present application clearer and more specific, the present application is further described in detail below with reference to the accompanying drawings and examples. It should be understood that the specific embodiments described herein are only used to explain the present application, and are not used to limit the present application.

For large-size touch control screens, before flexible circuit boards are bonded, open circuit and short circuit tests need to be performed on all channels to ensure normal operations of touch control functions. A traditional channel test is to test bonding terminals at both ends of touch control electrodes. However, due to a large number of channels in a current large-size touch control screen, an area of each terminal is small. With respect to an accuracy of a probe test equipment, it is difficult to ensure that each terminal is accurately connected, which causes low reliability and inability to perform an accurate touch control test. The present application provides the following technical solutions based on the above technical problems.

Please refer to FIGS. 1-4. The touch control substrate 100 includes a touch control region 200, test regions 300 positioned on both sides of the touch control region 200, and cutting regions 400 positioned between the test regions 300 and the touch control region 200.

The touch control substrate 100 includes:

a plurality of touch control electrodes 210 positioned in the touch control region 200, extending in a first direction X, and arranged at intervals along a second direction Y, wherein the first direction X is perpendicular to the second direction Y;

a plurality of test terminals 310 positioned in the test regions 300, wherein each of the test terminals 310 is connected to two adjacent touch control electrodes 210; and a plurality of electrical connection members 410 positioned in the cutting regions 400, wherein each of the electrical connection members 410 corresponds to each of the touch control electrodes 210, the touch control electrodes 210 are electrically connected to the test terminals 310 through the electrical connection members 410, and the touch control electrodes 210 form a series circuit through the corresponding electrical connection members 410 and the corresponding test terminals 310.

The present application provides the touch control substrate 100. The touch control substrate 100 includes the touch control region 200, the test regions 300, and the cutting regions 400. The touch control substrate 100 further includes: the plurality of touch control electrodes 210 positioned in the touch control region 200; the plurality of test terminals 310 positioned in the test regions 300, wherein each of the test terminals 310 is connected to two adjacent touch control electrodes 210; and the plurality of electrical connection members 410 positioned in the cutting regions 400, wherein each of the electrical connection members 410 corresponds to each of the touch control electrodes 210. The touch control electrodes 210 are electrically connected to the test terminals 310 through the electrical connection members 410. The touch control electrodes 210 form the series circuit through the corresponding electrical connection members 410 and the corresponding test terminals 310. During a test, an external power makes the series circuit into a series loop. An abnormality of the touch control electrodes is determined by a measurement voltage between any two test terminals 310 in the series loop obtained by a detection member. This relieves a technical problem that an accurate touch control test cannot be performed due to a small area of each terminal in the current large-size touch control screens.

The technical solutions of the present application will be described below in conjunction with specific embodiments.

Please refer to FIG. 1. The touch control substrate 100 includes the plurality of touch control electrodes 210 extending along the first direction X. The touch control electrodes 210 are arranged at intervals along the second direction Y. Two adjacent rows of the touch control electrodes 210 are insulated from each other. The first direction X can be parallel to a long side direction of the touch control substrate 100. The second direction Y can be parallel to a short side direction of the touch control substrate 100.

In this embodiment, a touch control method of the touch control substrate 100 can be a mutual capacitance touch control, which means that a touch control operation is determined by a change in capacitance between adjacent two of touch control sensing electrodes and touch control driving electrodes of different types. The touch control electrodes 210 can be one of the touch sensing electrodes or the touch driving electrodes, and the present application takes one of them as an example for description.

Both sides of the touch control region 200 are provided with bonding regions 500. The bonding regions 500 are provided with bonding terminals 510 corresponding to the touch control electrodes 210 in a one-to-one manner. Because both sides of the touch control substrate 100 of the present application are bonded in one time, the both sides of the touch control region 200 are provided with bonding regions 500, and both sides of each of touch control electrodes 210 are provided with bonding terminals 510. Because the bonding terminals 510 can be formed in a same process as the touch control electrodes 210, structures of the bonding terminals 510 will not be introduced in detail in the present application. The touch control electrodes 210 and the corresponding bonding terminals 510 being an integrated configuration is introduced below as a technical solution of the present application.

Sides of the bonding regions 500 away from the touch control region 200 are provided with test regions 300. The plurality of test terminals 310 connected to the touch control electrodes 210 are disposed in the test regions 300. Each of the test terminals 310 is electrically connected to two of the touch control electrodes 210. The test terminals 310 are configured to test a voltage across any one of the touch control electrodes 210, so as to detect whether the touch control electrodes 210 are normal.

Please refer to FIG. 1. The cutting regions 400 are further disposed between the test regions 300 and the bonding regions 500. The touch control substrate 100 removes metals in the cutting regions 400 in a subsequent process according to positions of the cutting regions 400. The cutting regions 400 are provided with the electrical connection members 410 connecting the test terminals 310 and the touch control electrodes 210.

In this embodiment, the electrical connection members 410 and the test terminals 310 can be formed in a same photomask process as the touch control electrodes 210 and the bonding terminals 510, which means that the electrical connection members 410, the test terminals 310, the touch control electrodes 210, and the bonding terminals 510 can be disposed in a same layer.

In the touch control substrate 100 of the present application, each of the electrical connection members 410 includes a first connection segment 411 and a second connection segment 412, which are continuous. The first connection segment 411 is connected to one of the touch control electrodes 210. The second connection segment 412 is connected to one of the test terminals 310. In two electrical connection members 410 connected to a same one of the test terminals 310, a distance between two adjacent second connection segments 412 is greater than a distance between two adjacent touch control electrodes 210.

In this embodiment, because the electrical connection members 410 need to be removed in the subsequent process, in an early configuration, in order to prevent two adjacent electrical connection members 410 from short-circuiting caused by cutting the electrical connection members 410, when the electrical connection members 410 are disposed, a distance between two adjacent electrical connection members 410 to be cut is usually greater than a distance between two adjacent electrical connection members 410 not cut. A technical solution of this embodiment mainly defines a subsequent cutting lines BB on the second connection segment 412. Therefore, it only needs to ensure that the distance between the two adjacent second connection segments 412 is greater than the distance between the two adjacent touch control electrodes 210.

In the touch control substrate 100 of the present application, in a direction of the first connection segment 411 toward the second connection segment 412, a width of the first connection segment 411 gradually decreases, a maximum width of the first connection segment 411 is equal to a width of each of the touch control electrodes 210, and a minimum width of the first connection segment 411 is equal to a width of the second connection segment 412.

Figure 2:
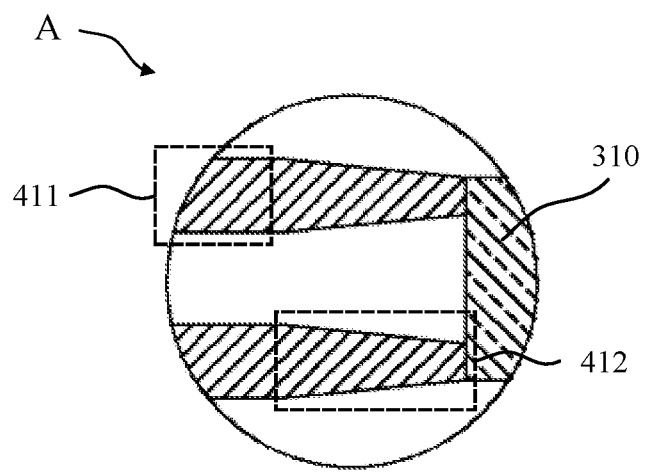
FIG. 2 is a first enlarged structural diagram of a region A in FIG. 1.

Please refer to FIG. 2. FIG. 2 is a first enlarged structural diagram of a region A in FIG. 1. This embodiment configures the first connection segment 411 as a necked shape, so that the width of the first connection segment 411 is gradually reduced, which further increases the distance between the two adjacent second connection segments 412 connected to the same one of the test terminals 310.

In addition, a structure of the first connection segment 411 is not limited to the configuration shown in FIG. 2, it only needs to ensure that the width of the first connection segment 411 is gradually reduced, and satisfies that the distance between the two adjacent second connection segments 412 connected to the same one of the test terminals 310 greater than the distance between the two adjacent touch control electrodes 210 or two adjacent first connection segments 411.

Figure 3:
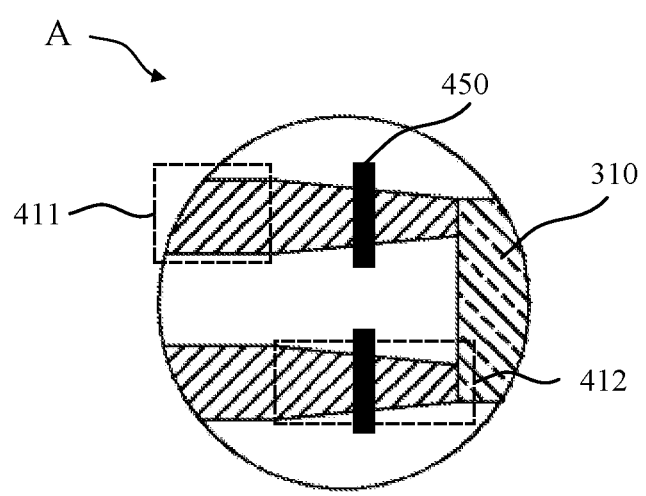
FIG. 3 is a second enlarged structural diagram of the region A in FIG. 1.

Please refer to FIG. 3. In the touch control substrate 100 of the present application, each of the electrical connection members 410 includes a first connection segment 411 and a second connection segment 412, which are discontinuous, and further includes an electrical switch 450 positioned on the second connection segment 412. The first connection segment 411 is connected to one of the touch control electrodes 210. The second connection segment 412 is connected to one of the test terminals 310. The electrical switch 450 is configured to control an electrical connection and an insulation connection between the first connection segment 411 and the second connection segment 412.

In this embodiment, a position of the electrical switch 450 is not limited to being positioned on the second connection segment 412 and can be positioned on the first connection segment 411. The electrical switch 450 positioned on the second connection segment 412 is taken as an example for description as follows.

In this embodiment, the electrical switch 450 can be a conventional switch or a thin-film transistor switch. For example, when the electrical switch 450 is a thin-film transistor switch, a thin-film transistor can be switched by inputting a corresponding high-level signal or a corresponding low-level signal through an external control line. When the touch control substrate 100 needs to perform a touch control test, the corresponding thin-film transistor switch through the control line can be turned on, so that the first connection segment 411 and the second connection segment 412 are electrically connected. When the touch control test is completed, an input signal of the control line is turned off, so that the corresponding thin-film transistor switch is turned off, so that the first connection segment 411 and the second connection segment 412 are disconnected. Therefore, this technical solution can selectively make the test terminals 310 to work or not to work. Furthermore, when products fail in the subsequent process after the touch control test is completed, the touch control electrodes 210 of the touch control substrate 100 can be tested again as long as the electrical switch 450 is closed, and a touch control layer does not need to be separated to be individually tested.

In the touch control substrate 100 of the present application, the test terminals 310 can be disposed on a side surface or a back surface of the touch control substrate 100. The test terminals 310 disposed on the side surface or the back surface of the touch control substrate 100 can also perform the touch control test on the touch control substrate 100. Because the test terminals 310 are arranged on the side surface or the back surface of the touch control substrate 100, the corresponding test regions 300 do not need to extend outside the both sides of the touch control substrate 100, and a narrow bezel design of the touch control substrate 100 is realized. In addition, when a cutting process is performed, the electrical connection members 410 and the test terminals 310 can also be removed together in one cutting process.

Figure 4:
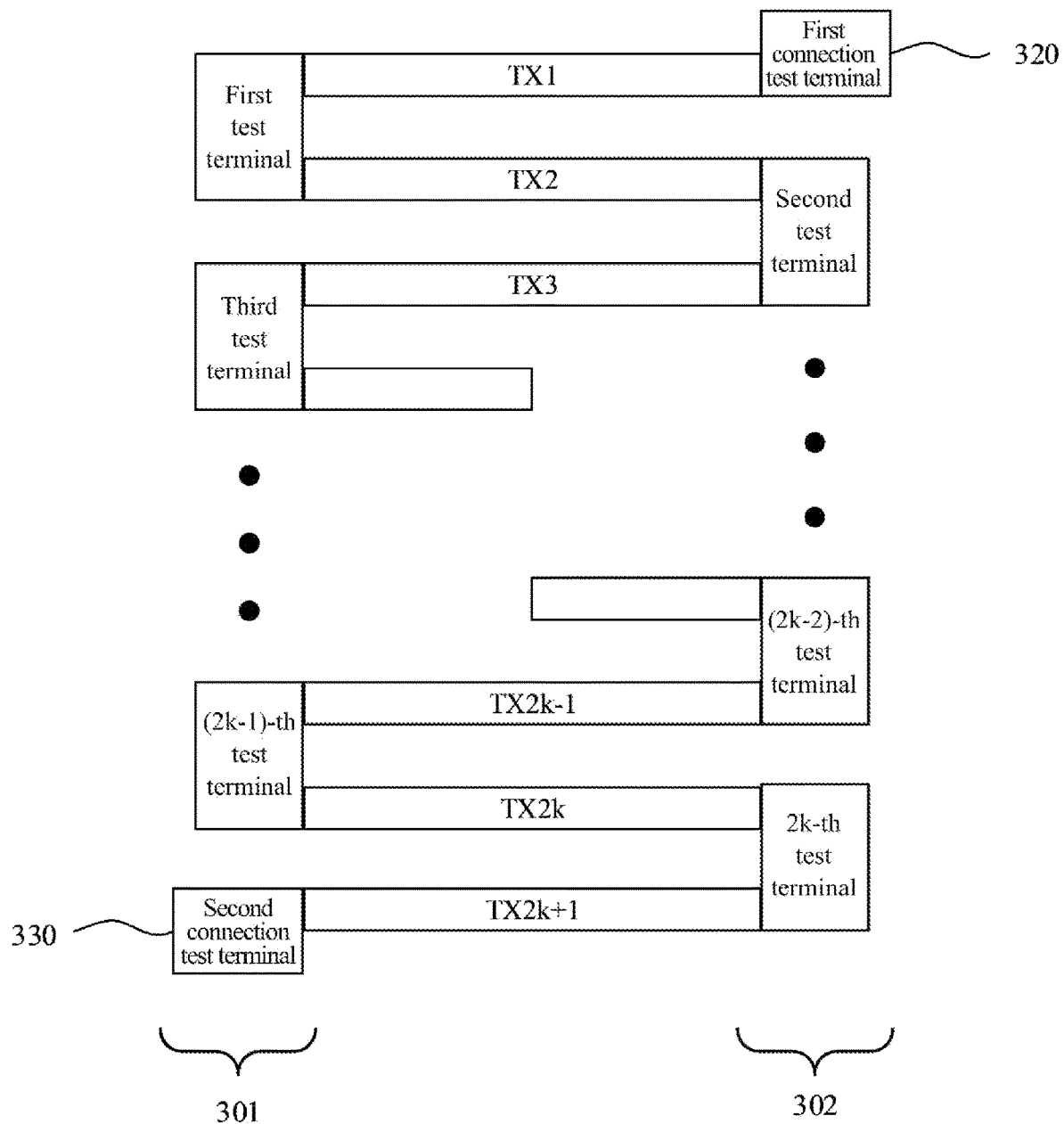
FIG. 4 is a simplified structural diagram of the touch control substrate of the present application.

Please refer to FIG. 4. In the touch control substrate 100 of the present application, the touch control substrate 100 further includes a first test subregion 301 positioned on a first side of the touch control region 200 and a second test subregion 302 positioned on a second side of the touch control region 200. The test regions 300 are provided with n test terminals 310. A (2k−1)-th test terminal 310 is positioned in the first test subregion 301. A 2k-th test terminal 310 is positioned in the second test subregion 302. The touch control region 200 is provided with n+1 touch control electrodes 210 arranged at intervals along the second direction. A (2k−1)-th touch control electrode $TX_{2k-1}$ is connected to a 2k-th touch control electrode $TX_{2k}$ through the (2k−1)-th test terminal 310. The 2k-th touch control electrode $TX_{2k}$ is connected to a (2k+1)-th touch control electrode $TX_{2k+1}$ through the 2k-th test terminal 310. n and k are positive integers, and n is greater than or equal to 2k.

In this embodiment, in the second direction Y of the touch control substrate 100, the touch control region 200 is provided with n+1 touch control electrodes 210. There are n test terminals 310 in the test regions 300, the test terminals 310 of odd-numbered items are positioned in the first test subregion 301, and the test terminals 310 of even-numbered items are positioned in the second test subregion 302. Each of the test terminals 310 is electrically connected to two adjacent touch control electrodes 210. Left and right sides of the touch control electrodes 210 are respectively connected to the test terminals 310. For example, a first side of a first touch control electrode $TX_1$ is electrically connected to a first test terminal 310, and a second side of the first touch control electrodes $TX_1$ is electrically connected to a first connection test terminal 320; a first side of a second touch control electrode $TX_2$ is electrically connected to the first test terminal 310, and a second side of the second touch control electrode $TX_2$ is electrically connected to a second test terminal 310; a first side of a third touch control electrode $TX_3$ is electrically connected to a third test terminal 310, and a second side of the third touch control electrode $TX_3$ is electrically connected to the second test terminal 310. In this manner, a first side of the (2k−1)-th touch control electrode $TX_{2k-1}$ is electrically connected to the (2k−1)-th test terminal 310, a second side of the (2k−1)-th touch control electrode $TX_{2k-1}$ is electrically connected to a (2k−2)-th test terminal 310; a first side of the 2k-th touch control electrode $TX_{2k}$ is electrically connected to the (2k−1)-th test terminal 310, a second side of the 2k-th touch control electrode $TX_{2k}$ is electrically connected to the 2k-th test terminal 310.

In addition, similar to the first touch control electrode 210, one end of a last electrode of the touch control substrate 100 is connected to the corresponding first connection test terminal 320, and the other end is connected to a second connection test terminal 330. For example, when the touch control region 200 is provided with n+1 touch control electrodes 210, a (n+1)-th touch control electrode 210 is electrically connected to the second connection test terminal 330. A structure shown in FIG. 1 of the present application is a structure provided with an odd number of the touch control electrodes 210, which means that a first side of the (2k+1)-th touch control electrode $TX_{2k+1}$ is electrically connected to the second connection terminal, and a second side of the (2k+1)-th touch control electrode $TX_{2k+1}$ is electrically connected to the 2k-th test terminal 310.

In this embodiment, two adjacent touch control electrodes 210 are electrically connected through one of the test terminals 310 and a corresponding one of the electrical connection members 410. The first connection test terminals 320 and the second connection test terminals 330 enable the touch control electrodes 210 to form a series circuit. The first connection test terminals 320 and the second connection test terminals 330 form a series loop through an external device.

Figure 5:
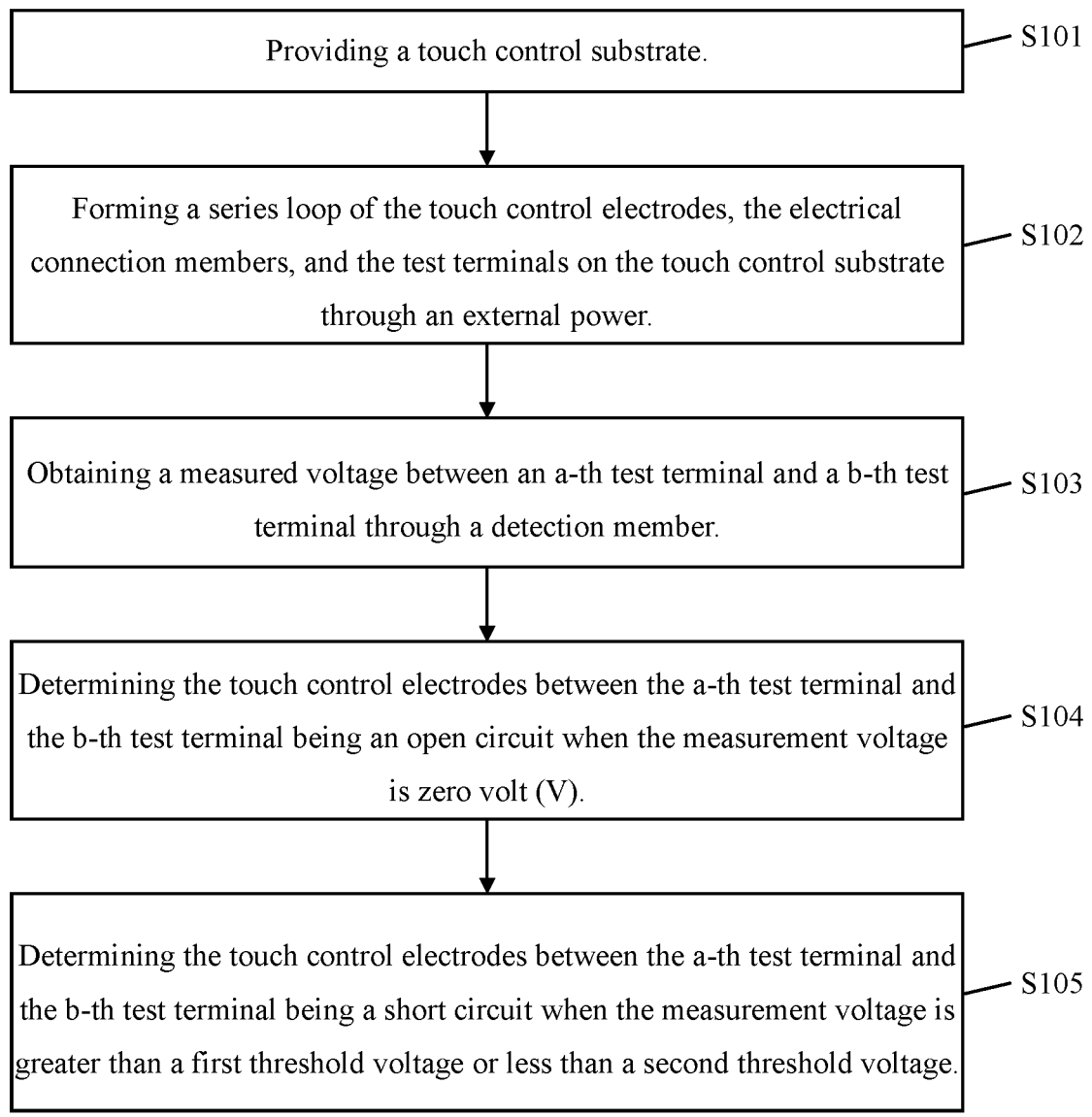
FIG. 5 is a flowchart of a test method of the touch control substrate of the present application.
Figure 6:
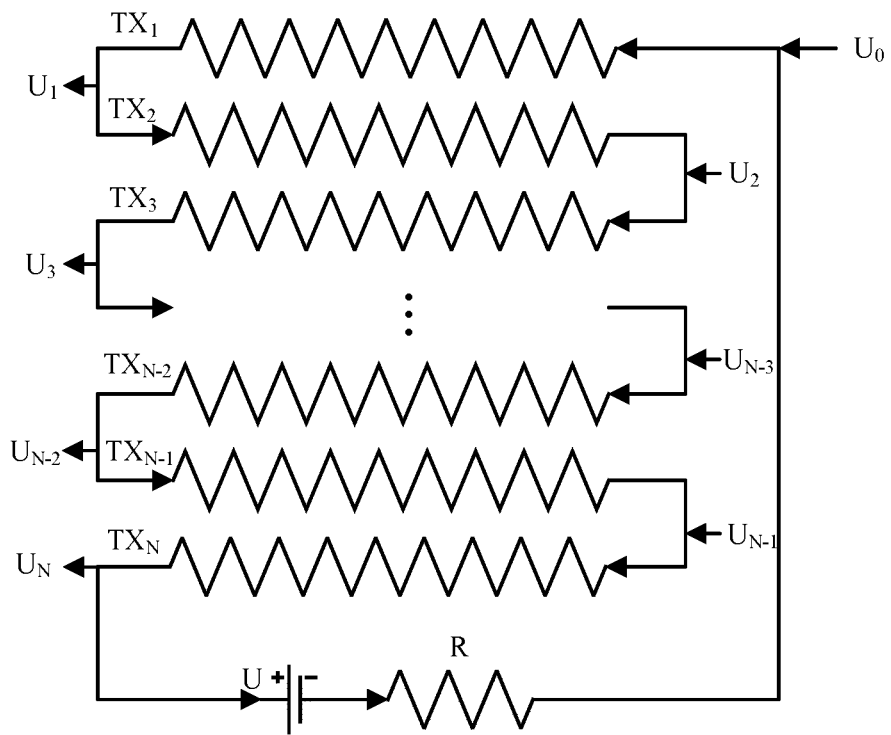
FIG. 6 is an equivalent circuit diagram of the touch control substrate of the present application.

Please refer to FIGS. 5 and 6. In another aspect of the present application, the present application further discloses a test method of the touch control substrate, which includes:

S101, providing the above touch control substrate 100, wherein the touch control substrate 100 includes a touch control region 200, test regions 300 positioned on both sides of the touch control region 200, and cutting regions 400 positioned between the test regions 300 and the touch control region 200; wherein the touch control substrate 100 further includes a plurality of touch control electrodes 210 positioned in the touch control region 200, extending in a first direction X, and arranged at intervals along a second direction Y, a plurality of test terminals 310 positioned in the test regions 300, and a plurality of electrical connection members 410 positioned in the cutting regions 400; wherein the first direction X is perpendicular to the second direction Y, each of the test terminals 310 is connected to two adjacent touch control electrodes 210, each of the electrical connection members 410 corresponds to each of the touch control electrodes 210, the touch control electrodes 210 are electrically connected to the test terminals 310 through the electrical connection members 410, and the touch control electrodes 210 form a series circuit through the corresponding electrical connection members 410 and the corresponding test terminals 310;

S102, forming a series loop of the touch control electrodes 210, the electrical connection members 410, and the test terminals 310 on the touch control substrate 100 through an external power;

S103, obtaining a measured voltage between an a-th test terminal 310 and a b-th test terminal 310 through a detection member;

S104, determining the touch control electrodes 210 between the a-th test terminal 310 and the b-th test terminal 310 being an open circuit when the measurement voltage is zero volt (V); and S105, determining the touch control electrodes 210 between the a-th test terminal 310 and the b-th test terminal 310 being a short circuit when the measurement voltage is greater than a first threshold voltage or less than a second threshold voltage.

a and b are positive integers. a is less than or equal to b. b is less than or equal to n+1.

The circuit diagram in FIG. 6 is an equivalent circuit diagram of the series loop formed after a structure in FIG. 1 is connected to the external power. In this embodiment, the touch control electrodes 210 are determined whether they are normally connected according to the measurement voltage between any two test terminals 310 in the equivalent circuit diagram.

In this embodiment, the detection member can be a conventional probe jig, which can directly obtain a voltage at both ends of the probe jig and is not described in detail in this embodiment. An adjustable resistor R is further built in the external power in FIG. 6, which is configured to control a current in the series loop within a target range of a measurement test, and its specific size is limited according to actual conditions.

In a measurement loop of the present application, because an equivalent resistance value of any touch control electrodes 210 is basically same, it can be known from a resistance division principle that voltage values $U_0$-$U_N$ in the figure increase linearly, and this can determine that channels have no open circuit and short circuit. Alternatively, a voltage across any touch control electrodes 210 is measured to compare the voltage to a design value within an error range to determine whether the channels are normal.

For example, when the probe jig of the detection member is on the first connection test terminal 320 and the first test terminal 310, the measurement voltage obtained by the probe jig is a partial voltage of the first touch control electrode 210; when the probe jig of the detection member is on the first test terminal 310 and the second test terminal 310, the measurement voltage obtained by the probe jig is a partial voltage of the second touch control electrode 210; when the probe jig of the detection member is on the first test terminal 310 and the third test terminal 310, the measurement voltage obtained by the probe jig is a sum of the partial voltages of the second touch control electrode 210 and the third touch control electrode 210.

Figure 7:
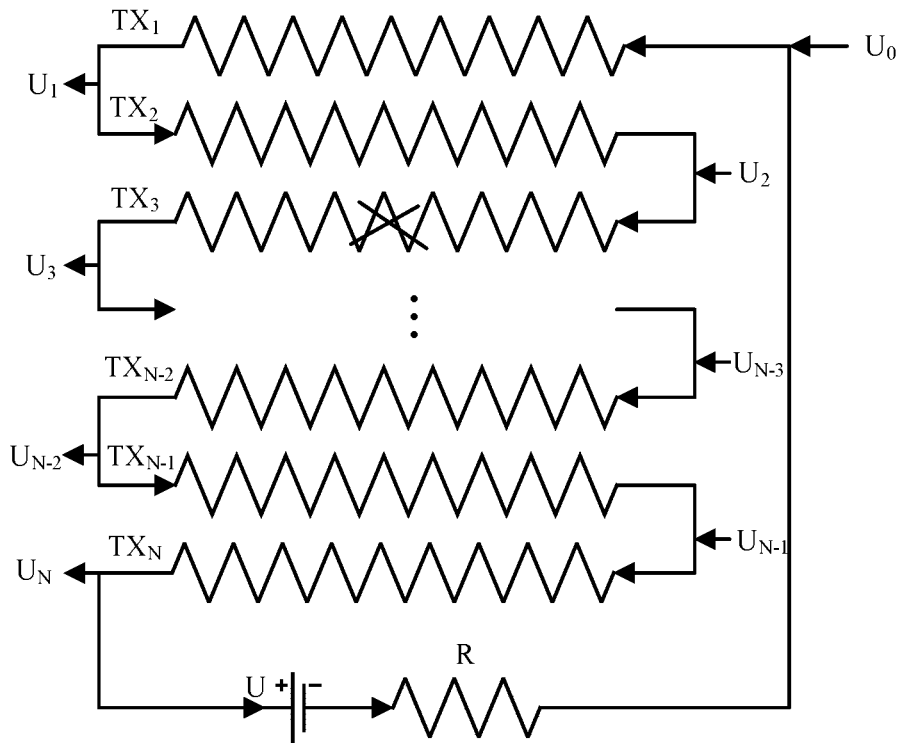
FIG. 7 is an equivalent circuit diagram of the touch control substrate of the present application being an open circuit.

Please refer to FIG. 7. When an open circuit occurs to the third touch control electrode 210, which means that the third touch control electrode 210 has a breakage technical problem, and when the probe jig of the detection member is on the first connection test terminal 320 and the second test terminal 310, because the third touch control electrode 210 is broken, the measurement voltages $U_0$-$U_2$ obtained by the probe jig are 0V, and the measurement voltages $U_3$-$U_N$ obtained by the probe jig are a power voltage.

Figure 8:
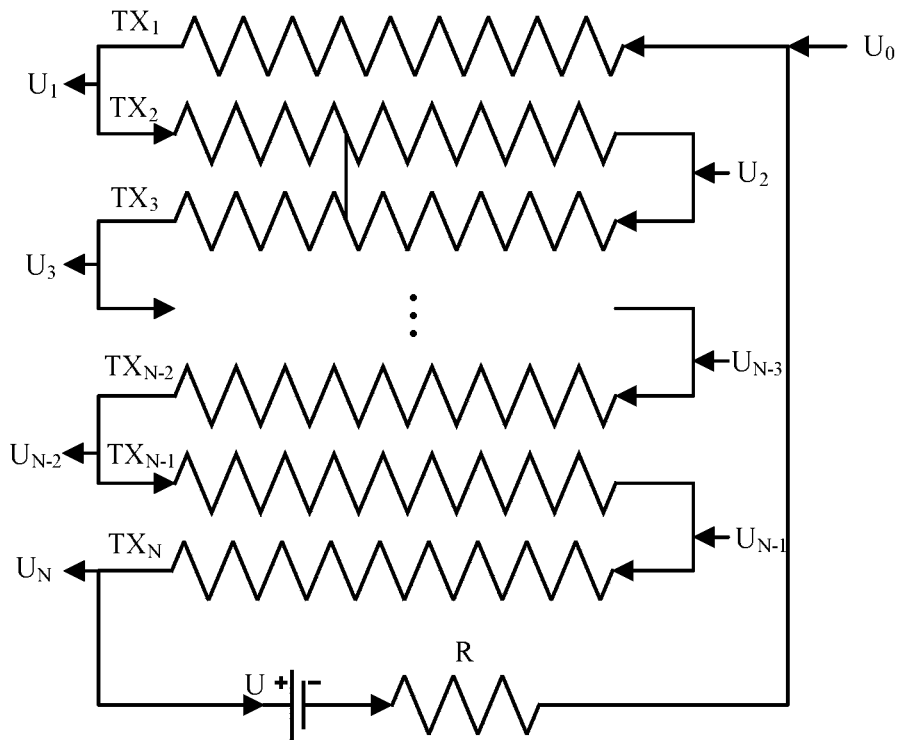
FIG. 8 is an equivalent circuit diagram of the touch control substrate of the present application being a short circuit.

Please refer to FIG. 8. When the second touch control electrode 210 and the third touch control electrode 210 are short-circuited, which means that traces in this region are connected together to cause a short circuit in this region, an impedance of the series loop of the present application is thereby decreased and a loop current is increased. Therefore, starting from a cathode of the power, a partial current divided by a voltage divider resistor and the first touch control electrode 210 will be increased, which means that the measurement voltages $U_0$-$U_1$ obtained by the probe jig will be increased compared to the designed value. Because the power voltage is a constant voltage, the measurement voltages $U_3$-$U_N$ obtained by the probe jig will be reduced compared to the design value. because a measurement position of $U_2$ is a short-circuited region, a voltage in this region is uncertain and cannot be accurately obtained. A difference between the measurement voltage $U_2$ and an adjacent measurement terminal is quite different from a difference between another two adjacent measurement terminals. The series loop can be determined whether it is short-circuited by measuring whether the measurement voltage and the design value of any two endpoints are within the error range. When the difference between the measurement terminal and the adjacent measurement terminal is greater than the difference of the measurement voltage between any two adjacent measurement terminals, two touch control electrodes 210 corresponding to the measurement terminal can be determined to be short-circuited.

In the present application, the extended measurement terminals of a plurality of rows of the touch control electrodes 210 arranged insulatedly and the electrical connection members 410 between the measurement terminals and the touch control electrodes 210 form the series circuit, and the external power further makes the series circuit into the series loop. An abnormality of the touch control electrodes 210 is determined by the measurement voltage between any two test terminals 310 in the series loop obtained by the detection member. This relieves a technical problem that an accurate touch control test cannot be performed due to a small area of each terminal in the current large-size touch control screens.

Figure 9:
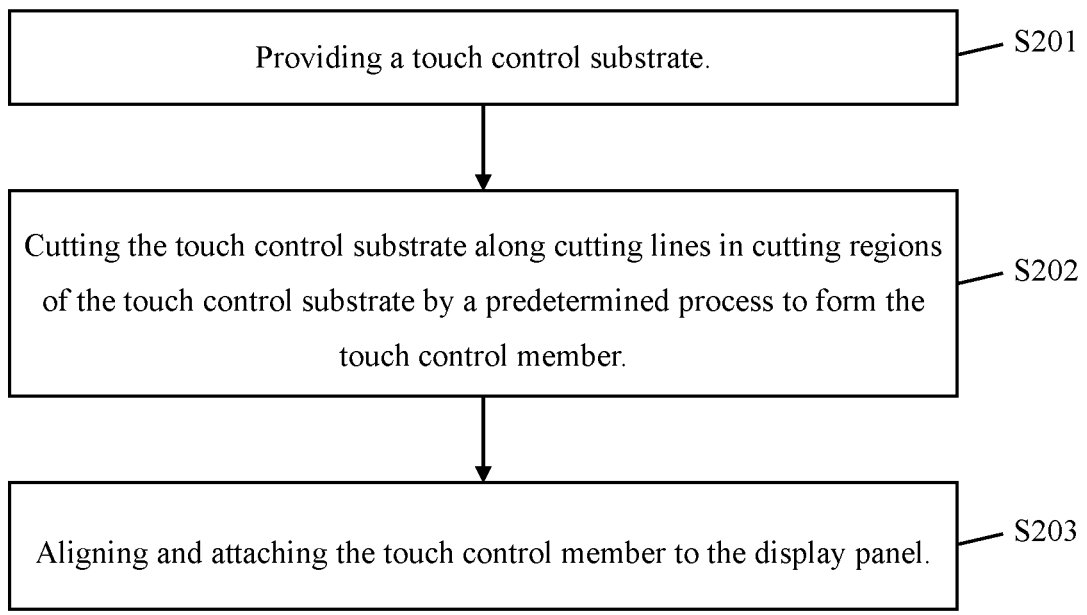
FIG. 9 is a flowchart of a manufacturing method of a touch control screen of the present application.

Please refer to FIG. 9. In another aspect of the present application, the present application further provides a manufacturing method of a touch control screen. The touch control screen includes a display panel and a touch control member positioned on the display panel. The manufacturing method of the touch control screen includes:

S201, providing the above touch control substrate 100;

S202, cutting the touch control substrate 100 along cutting lines BB in cutting regions 400 of the touch control substrate 100 by a predetermined process to form the touch control member; and S203, aligning and attaching the touch control member to the display panel.

Figure 10:
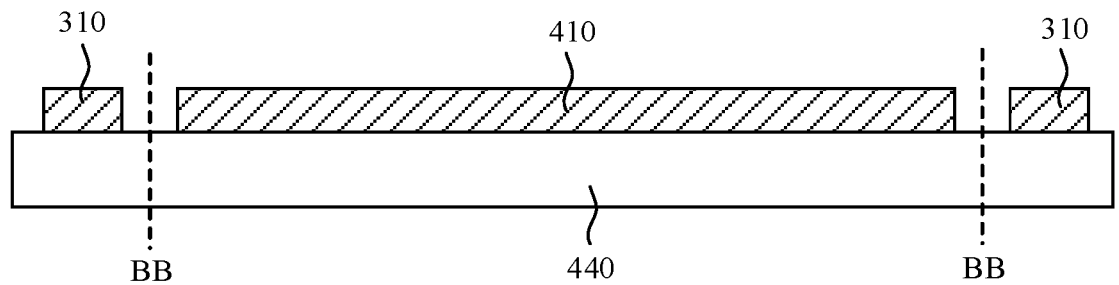
FIG. 10 is a first structural diagram of processing the touch control screen of the present application.

Please refer to FIG. 10. In this embodiment, because the test terminals 310 are only configured for testing, in actual products, this structure can be removed to prevent it from affecting an arrangement of the touch control electrodes 210. Therefore, the step of cutting the touch control substrate 100 along the cutting lines BB in the cutting regions 400 of the touch control substrate 100 by the predetermined process to form the touch control member includes: obtaining information of positions of the cutting lines BB of the touch control substrate 100; and cutting the electrical connection members 410 in the cutting regions 400 according to the positions of the cutting lines BB by a laser cutting process to insulatedly connect the test terminals 310 and the touch control electrodes 210.

In this step, after completing the above test of the touch control electrodes 210, the test terminals 310 can be directly removed by the laser cutting process or other processes. In FIG. 2, because a distance between two adjacent second connection segments 412 in the electrical connection members 410 is greater than a distance between the first connection segments 411 in a same structure, the positions of the cutting lines BB are selected on the second connection segments 412.

In this embodiment, an orthographic projection of the cutting lines BB on the touch control members is parallel to the second direction Y and intersects the second connection segment 412.

In this embodiment, the orthographic projection of the cutting lines BB on the touch control member can further be parallel to the second direction Y and intersects the first connection segment 411. Because the cutting lines BB are defined close to the first connection segment 411, and a distance between two adjacent first connection segments 411 needs to be limited when cutting the touch control substrate 100, when the cutting lines BB are defined on the first connection segment 411, a distance between one of the positions of the cutting lines BB and a boundary between the first connection segment 411 and the second connection segment 412 is not less than 2 mm.

In this embodiment, the step of cutting the touch control substrate 100 along the cutting lines BB in the cutting regions 400 of the touch control substrate 100 by the predetermined process to form the touch control member can further includes: obtaining information of positions of the cutting lines BB of the touch control substrate 100; and cutting a substrate 440 and the electrical connection members 410 on the substrate in the cutting regions 400 according to the positions of the cutting lines by the laser cutting process to insulatedly connect the test terminals 310 and the touch control electrodes 210.

Figure 11:
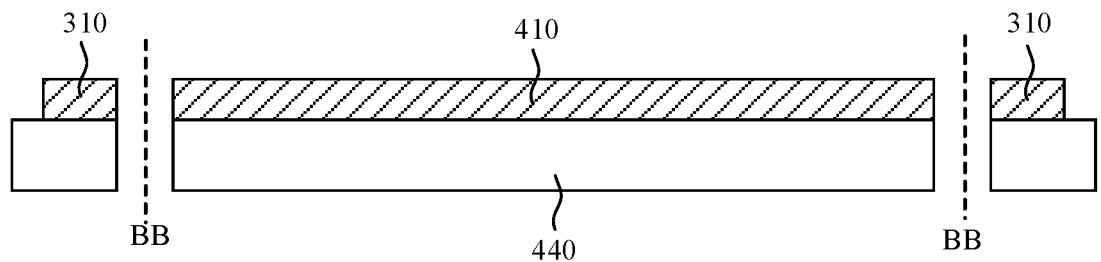
FIG. 11 is a second structural diagram of processing the touch control screen of the present application.

Please refer to FIG. 11. In this step, in order to realize a narrow bezel design of products, when the electrical connection members 410 are cut, the substrate 440 can also be cut along the cutting lines BB.

The present application further provides a touch control screen. The touch control screen is manufactured by the manufacturing method of the above touch control screen.

The present application further provides an electronic device. The electronic device includes the above touch control screen. The electronic device can include conventional display devices such as mobile phones and computers.

The present application provides the touch control substrate, the test method thereof, and the manufacturing method of the touch control screen. The touch control substrate includes the touch control region, the test regions, and the cutting regions. The touch control substrate further includes: the plurality of touch control electrodes positioned in the touch control region; the plurality of test terminals positioned in the test regions, wherein each of the test terminals is connected to two adjacent touch control electrodes; and the plurality of electrical connection members positioned in the cutting regions, wherein each of the electrical connection members corresponds to each of the touch control electrodes. The touch control electrodes are electrically connected to the test terminals through the electrical connection members. The touch control electrodes form the series circuit through the corresponding electrical connection members and the corresponding test terminals. During the test, the external power makes the series circuit into the series loop. The abnormality of the touch control electrodes is determined by the measurement voltage between any two test terminals in the series loop obtained by the detection member. This relieves a technical problem that an accurate touch control test cannot be performed due to a small area of each terminal in the current large-size touch control screens.

It can be understood that those having ordinary skills of the art may easily contemplate various changes and modifications of the technical solution and technical ideas of the present application and all these changes and modifications are considered within the protection scope of right for the present application.

What is claimed is:

1. A touch control substrate, comprising:
   a touch control region;
   test regions positioned on both sides of the touch control region;
   cutting regions positioned between the test regions and the touch control region;
   a plurality of touch control electrodes positioned in the touch control region, extending in a first direction, and arranged at intervals along a second direction, wherein the first direction is perpendicular to the second direction;
   a plurality of electrical connection members positioned in the cutting regions and electrically connected to the touch control electrodes; and
   a plurality of test terminals positioned in the test regions, wherein each of the test terminals is connected to two adjacent touch control electrodes through the electrical connection members;
   wherein the touch control substrate further comprises a first test subregion positioned on a first side of the touch control region and a second test subregion positioned on a second side of the touch control region;
   the test regions are provided with n test terminals, a (2k−1)-th test terminal is positioned in the first test subregion, and a 2k-th test terminal is positioned in the second test subregion;
   the touch control region is provided with n+1 touch control electrodes arranged at intervals along the second direction, a (2k−1)-th touch control electrode is connected to a 2k-th touch control electrode through the (2k−1)-th test terminal, and the 2k-th touch control electrode is connected to a (2k+1)-th touch control electrode through the 2k-th test terminal; and n and k are positive integers, and n is greater than or equal to 2k.

2. The touch control substrate according to claim 1, wherein each of the electrical connection members comprises a first connection segment and a second connection segment, which are continuous;

the first connection segment is connected to one of the touch control electrodes, and the second connection segment is connected to one of the test terminals; and in two electrical connection members connected to a same one of the test terminals, a distance between two adjacent second connection segments is greater than a distance between two adjacent touch control electrodes.

3. The touch control substrate according to claim 2, wherein in a direction of the first connection segment toward the second connection segment, a width of the first connection segment gradually decreases, a maximum width of the first connection segment is equal to a width of each of the touch control electrodes, and a minimum width of the first connection segment is equal to a width of the second connection segment.

4. The touch control substrate according to claim 1, wherein each of the electrical connection members comprises a first connection segment and a second connection segment, which are discontinuous, and further comprises an electrical switch positioned on the second connection segment;

the first connection segment is connected to one of the touch control electrodes, and the second connection segment is connected to one of the test terminals; and the electrical switch is configured to control an electrical connection and an insulation connection between the first connection segment and the second connection segment.

5. The touch control substrate according to claim 1, wherein the test regions are provided with a first connection test terminal connected to a first touch control electrode and a second connection test terminal connected to an (n+1)-th touch control electrode, and the first connection test terminal and the second connection test terminal form a series loop through an external device.

6. A test method of a touch control substrate, comprising:
providing a touch control substrate comprising a touch control region, test regions positioned on both sides of the touch control region, cutting regions positioned between the test regions and the touch control region, a plurality of touch control electrodes positioned in the touch control region, extending in a first direction, and arranged at intervals along a second direction, a plurality of electrical connection members positioned in the cutting regions and electrically connected to the touch control electrodes, and a plurality of test terminals positioned in the test regions, wherein the first direction is perpendicular to the second direction, and each of the test terminals is connected to two adjacent touch control electrodes through the electrical connection members, wherein the touch control substrate further comprises a first test subregion positioned on a first side of the touch control region and a second test subregion positioned on a second side of the touch control region; the test regions are provided with n test terminals, a (2k−1)-th test terminal is positioned in the first test subregion, and a 2k-th test terminal is positioned in the second test subregion; the touch control region is provided with n+1 touch control electrodes arranged at intervals along the second direction, a (2k−1)-th touch control electrode is connected to a 2k-th touch control electrode through the (2k−1)-th test terminal, and the 2k-th touch control electrode is connected to a (2k+1)-th touch control electrode through the 2k-th test terminal; and n and k are positive integers, and n is greater than or equal to 2k;

forming a series loop of the touch control electrodes, the electrical connection members, and the test terminals on the touch control substrate through an external power;

obtaining a measured voltage between an a-th test terminal and a b-th test terminal through a detection member;

determining the touch control electrodes between the a-th test terminal and the b-th test terminal being an open circuit when the measurement voltage is zero volt (V); and determining the touch control electrodes between the a-th test terminal and the b-th test terminal being a short circuit when the measurement voltage is greater than a first threshold voltage or less than a second threshold voltage;

wherein a and b are positive integers, a is less than or equal to b, and b is less than or equal to n+1.

7. The test method of the touch control substrate according to claim 6, wherein each of the electrical connection members comprises a first connection segment and a second connection segment, which are continuous;

the first connection segment is connected to one of the touch control electrodes, and the second connection segment is connected to one of the test terminals; and in two electrical connection members connected to a same one of the test terminals, a distance between two adjacent second connection segments is greater than a distance between two adjacent touch control electrodes.

8. The test method of the touch control substrate according to claim 7, wherein in a direction of the first connection segment toward the second connection segment, a width of the first connection segment gradually decreases, a maximum width of the first connection segment is equal to a width of each of the touch control electrodes, and a minimum width of the first connection segment is equal to a width of the second connection segment.

9. The test method of the touch control substrate according to claim 6, wherein each of the electrical connection members comprises a first connection segment and a second connection segment, which are discontinuous, and further comprises an electrical switch positioned on the second connection segment;

the first connection segment is connected to one of the touch control electrodes, and the second connection segment is connected to one of the test terminals; and the electrical switch is configured to control an electrical connection and an insulation connection between the first connection segment and the second connection segment.

10. A touch control substrate, comprising:
a touch control region;
test regions positioned on both sides of the touch control region;
cutting regions positioned between the test regions and the touch control region;
a plurality of touch control electrodes positioned in the touch control region, extending in a first direction, and arranged at intervals along a second direction, wherein the first direction is perpendicular to the second direction;

a plurality of electrical connection members positioned in the cutting regions and electrically connected to the touch control electrodes; and a plurality of test terminals positioned in the test regions, wherein each of the test terminals is connected to two adjacent touch control electrodes through the electrical connection members;

wherein each of the electrical connection members comprises a first connection segment and a second connection segment, which are continuous;

the first connection segment is connected to one of the touch control electrodes, and the second connection segment is connected to one of the test terminals; and in two electrical connection members connected to a same one of the test terminals, a distance between two adjacent second connection segments is greater than a distance between two adjacent touch control electrodes.

11. The touch control substrate according to claim 10, wherein in a direction of the first connection segment toward the second connection segment, a width of the first connection segment gradually decreases, a maximum width of the first connection segment is equal to a width of each of the touch control electrodes, and a minimum width of the first connection segment is equal to a width of the second connection segment.

12. The touch control substrate according to claim 10, further comprising an electrical switch positioned on the second connection segment, wherein the electrical switch is configured to control an electrical connection and an insulation connection between the first connection segment and the second connection segment.

13. The touch control substrate according to claim 10, wherein the touch control substrate further comprises a first test subregion positioned on a first side of the touch control region and a second test subregion positioned on a second side of the touch control region;

the test regions are provided with n test terminals, a (2k−1)-th test terminal is positioned in the first test subregion, and a 2k-th test terminal is positioned in the second test subregion;

the touch control region is provided with n+1 touch control electrodes arranged at intervals along the second direction, a (2k−1)-th touch control electrode is connected to a 2k-th touch control electrode through the (2k−1)-th test terminal, and the 2k-th touch control electrode is connected to a (2k+1)-th touch control electrode through the 2k-th test terminal; and n and k are positive integers, and n is greater than or equal to 2k.

14. The touch control substrate according to claim 13, wherein the test regions are provided with a first connection test terminal connected to a first touch control electrode and a second connection test terminal connected to an (n+1)-th touch control electrode, and the first connection test terminal and the second connection test terminal form a series loop through an external device.

\* \* \* \* \*